Nov. 23, 1965   R. M. BACCHI ETAL   3,218,886
VALVE OPERATOR

Filed May 11, 1962   2 Sheets-Sheet 1

RAY M. BACCHI
CHARLES J. DENNEHY
INVENTOR.

BY Lothrop & West

ATTORNEYS

Nov. 23, 1965  R. M. BACCHI ETAL  3,218,886
VALVE OPERATOR

Filed May 11, 1962  2 Sheets-Sheet 2

RAY M. BACCHI
CHARLES J. DENNEHY
INVENTOR.

BY Lothrop & West

ATTORNEYS

United States Patent Office 3,218,886
Patented Nov. 23, 1965

3,218,886
VALVE OPERATOR
Ray M. Bacchi, San Bruno, and Charles J. Dennehy, San Francisco, Calif., assignors, by mesne assignments, to Andale Company, Lansdale, Pa., a corporation of Pennsylvania
Filed May 11, 1962, Ser. No. 193,983
10 Claims. (Cl. 74—626)

Our invention relates to means for rotating shafting, particularly shafting connected to valves such as ball or gate valves in the hydraulic field and is related to the valve operator disclosed in Patent No. 3,031,899 issued to Ray Bacchi on May 1, 1962 and assigned to the assignee of the present invention.

Valve operators are customarily provided to actuate a valve shaft by either or both of two driving means. An electric motor of the reversible sort is normally utilized to drive the valve shaft in either one of two opposite directions and also a hand wheel is provided for manual operation of the valve shaft in either of the two directions. It is quite important that there be provided some mechanism for preventing the electric motor from driving the hand wheel because if this occurs it may be dangerous.

It is customary to connect both the electric driving motor and the hand wheel to drive the valve shaft through a planetary gearing mechanism. To prevent accidents a non-overhauling worm is interposed between the electric motor and one gear of the planetary gear train, and another non-overhauling worm is interposed between the hand wheel and another of the gears of the planetary train. While this arrangement works well and is entirely satisfactory, it is relatively expensive and complex so that the cost of valve operators constructed according to that scheme remains high.

It is therefore an object of the invention to provide a valve operator in which at least one of the non-overhauling worm mehcanisms can be dispensed with and hand wheel efficiency increased.

Another object of the invention is to provide a valve operator in which there is assurance that the hand wheel cannot be driven by the electric motor, and in which the mechanism is greatly simplified and made more economical.

A still further object of the invention is to provide a valve operator in which the complexity of the mechanism and its bulk are both greatly reduced.

A still further object of the invention is to provide a valve operator in which the mechanical layout of the parts conduces to easy assembly and subsequently to ready servicing.

A still further object of the invention is to provide a simple but effective torque responsive mechanism for controlling the operation of the electric motor.

Other objects together with the foregoing are attained in the commercial embodiment of the invention described in the accompanying description and illustrated in the accompanying drawings, in which.

Figure 1:
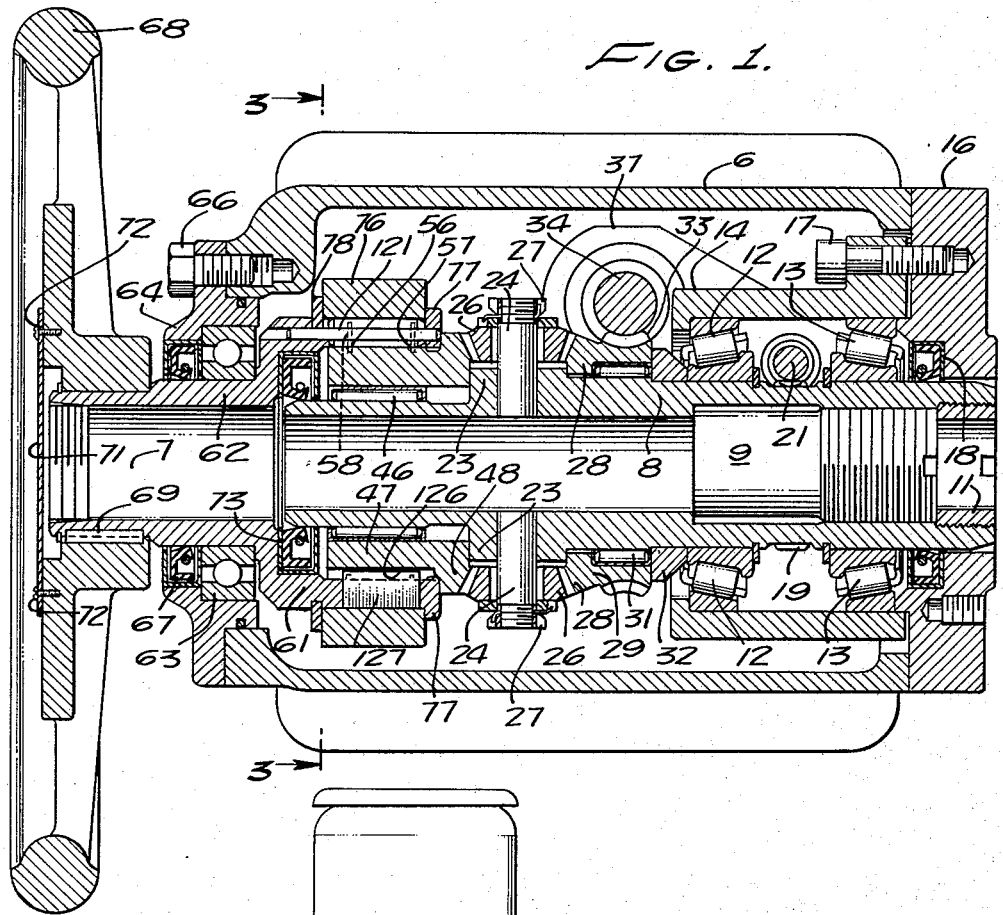
FIGURE 1 is a transverse cross section in a plane including the rotational axis of the mechanism.

In its usual commercial embodiment for actuation of a valve, the valve operator includes a frame 6 customarily in the form of a hollow casting. Mounted in the casting for rotation about a main axis 7 is a driven shaft 8. This customarily is a tubular member deisgned to receive any one of a number of adapter nuts 9 threaded into the interior of the driven shaft 8 and anchored by a lock ring 11. The valve shaft (not shown) in any particular instance is interengaged with the adapter nut 9. The valve shaft is either rotated about the axis 7 or is translated along the axis 7, depending upon the nature of the particular valve to which the operator is attached.

The driven shaft 8 is journalled in the frame 6 by means of a pair of tapered roller bearings 12 and 13 carrying the shaft 8 on their interior and disposed in a bearing cage 14 fastened to an end closure plate 16 of the frame 6 by removable fastenings 17. A lubricant seal 18 protects the integrity of the frame 6. The shaft 8 has an indicator drive gear 19 meshing with an indicator driven gear 21 going to indicator or position limit switch mechanisms, as the above-identified patent shows.

The shaft 8 is driven in either or both of two power sources through the means of a planetary train of gears. The shaft 8 at a convenient location includes an enlarged hub 23 serving as the mounting for radial spindles 24 each carrying one of a number of bevel planet gears 26 secured in place by fastening nuts 27. The gears 26 on one side are in mesh with a side bevel gear 28 cut in a side ring 29 journalled on the exterior of the driven shaft 8 by means of antifriction rollers 31. A positioning ring 32 is interposed between the side ring 29 and the adjacent one of the bearings 12. Also cut on the side ring 29 is a worm gear wheel 33 designed to mesh with a non-overhauling drive worm 34.

Figure 2:
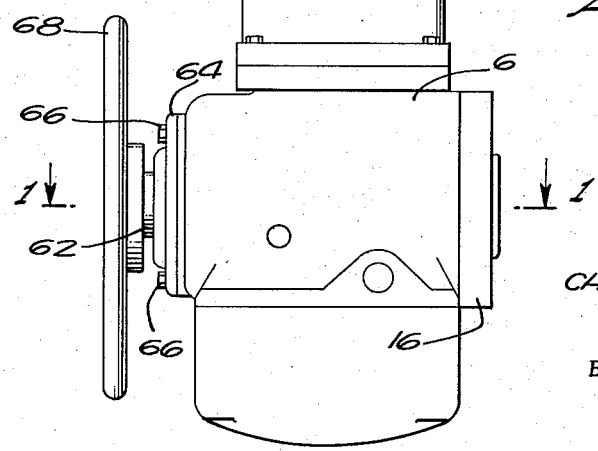
FIGURE 2 is a plan showing the valve operator in its usual position of installation and indicating by the lines 1—1 the plane of section of FIGURE 1.
Figure 3:
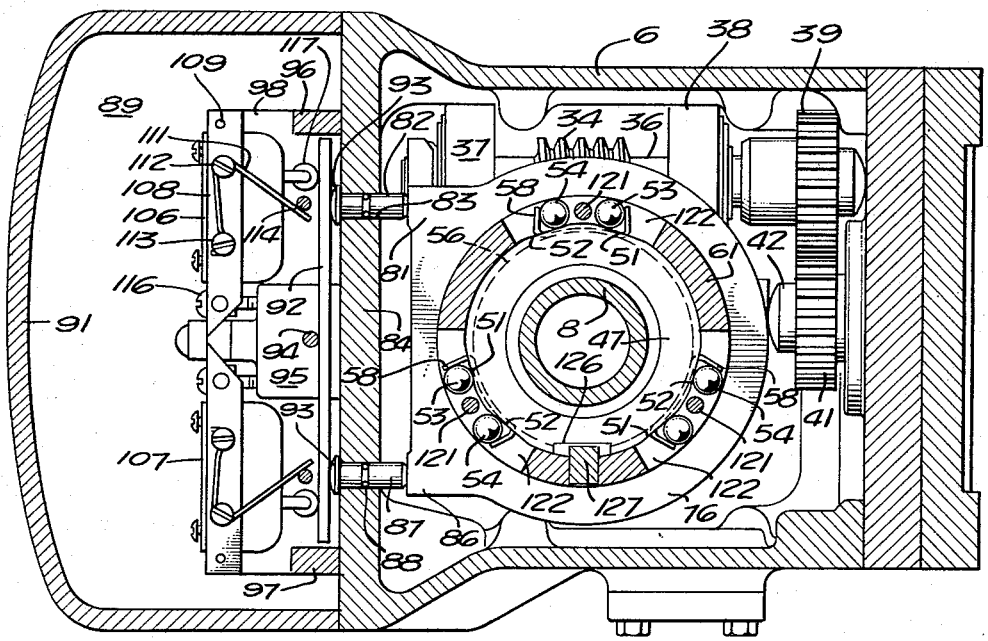
FIGURE 3 is a cross section, the plane of which is indicated by the lines 3—3 of FIGURE 1.

As shown in FIGURE 3, the non-overhauling worm 34 is formed on a shaft 36 mounted in appropriate bearing carriers 37 and 38 projecting from the end plate 16 of the frame 6. The shaft 36 also carries a driven spur gear 39 meshing with a driving spur gear 41 on the shaft 42 of an electric drive motor 43 (FIGURE 2). The electric motor can rotate in either direction so that the non-overhauling worm 34 can rotate the side gear 28 in either direction and through the planetary bevels 26 can rotate the driven shaft 8 in either of two directions, provided only that the planetary bevel gears 26 are appropriately constrained.

Journalled on an extension of the driven shaft 8 by means of needle bearings 46 is a side ring 47 having a number of different functions. One end of the side ring 47 is cut to provide a planetary side gear 48 meshing with the planetary pinions 26 in the customary way. The side ring 47 on part of its external periphery acts as a jamming member and so is provided with a number of cam or jamming surfaces 51 having the same inclination and is also provided adjacent thereto with a number of other cam or jamming surfaces 52 having the opposite direction of inclination. The jamming surfaces 51 are hardened so as to engage and jam with a number of jamming rollers 53 effective in one direction and the hardened jamming surfaces 52 engage and jam with a similar plurality of jamming rollers 54 effective in the opposite direction.

The ring 47 is provided with a pair of peripheral grooves 56 and 57 each designed to receive and support a number of U-shaped clip springs 58. Each spring has a central portion slidably seated in its respective groove and has upstanding approximately radially directed end portions effective to urge the respective jamming rollers 53 and 54 of each pair toward each other in a circumferential direction.

Journalled on the side ring 47 is one end 61 of a hand drive shaft 62. This shaft is preferably tubular and is coaxial with the driven shaft 8. The hand drive shaft is carried in an antifriction bearing 63 mounted in a removable cap 64 secured to the frame 6 by fastenings 66. A lubricant seal 67 is provided. The hand drive shaft 62 on its outboard end carries a removable hand wheel 68 in the customary fashion. The hand wheel is fixed for rotation with the hand driven shaft 62 by a key 69. The open center of the hand wheel 68 in the present instance is closed by a name plate 71, removably positioned by fastenings 72. In some instances, the valve shaft (not shown) extends upwardly through the tubular hand drive shaft. In those instances, the name plate 71 is removed. To retain lubricant within the hollow frame 6 there is provided a lubricant seal 73 on the interior of the end 61 of the hand driven shaft for engagement with the extension of the driven shaft 8.

The jamming rollers 53 and 54 operate against an encompassing torque ring 76 also acting as a jamming member and mounted for limited rotation on the exterior of the extension 61 of the hand driven shaft. The torque ring is axially located between a shoulder 77 on the hand driven shaft and a snap ring 78 thereon. The torque ring 76 and the extension 61 of the hand driven shaft are free for relative rotation but are constrained against relative axial translation.

The torque ring 76 is permitted to have only a limited rotation relative to the frame 6. As particularly illustrated in FIGURE 3, the torque ring has one abutment 81 on one side of its center contacting a through pin 82 sealed by an O-ring 83 and translatably mounted in a wall 84 of the frame 6. Similarly, an abutment 86 on the other side of center of the torque ring is in contact with a translatable through pin 87 sealed by an O-ring 88 and movable in the wall 84. The pins 82 and 87 on the far side of the wall 84 emerge in a switch compartment 89 closed by a protecting cover 91. A leaf spring 92 is arranged to abut the enlarged heads 93 of the pins 82 and 87 and to be fulcrumed on a cross rod 94 mounted in a sub-frame 95 fastened to and projecting from the wall 84.

The leaf spring 92 is confined in an endwise direction by end walls 96 and 97, forming part of the sub-frame 95 in which the cross rod 94 is mounted. The stiffness of the bar or leaf spring 92 is such that only a limited amount of movement in either direction of the torque ring 76 about the axis 7 is permitted. The amount of rotation of the torque ring in either direction is proportionate to the amount of torque imposed thereon in accordance with the deflection of the spring 92. The heads 93 of the through pins 82 and 87 serve as stops against the wall 84 so that for either direction of rotation the torque ring 76 produces a corresponding bending of the leaf spring.

In the operation of this portion of the structure, when the electric motor is effective and there is a reaction from the planetary bevels 26 on the side gear 48, there is produced some rotation of the side ring 47 in the corresponding direction. For a side ring rotation clockwise in FIGURES 3 and 4, for example, the cam surfaces 51 rotate slightly relative to the normally restrained and stationary torque ring 76. The rotating cam surfaces advance the rollers 53 slightly in the same clockwise direction and jam the rollers between the rising surfaces 51 and the outside cam ring, thus acting as a jamming roller mechanism and locking the side ring 47 and the cam ring 76 together. The gear torque reaction is thus transmitted through the torque ring 76 and tends to displace the pin 87 to the left from the FIGURE 3 position to the FIGURE 4 position and thus to deflect the leaf spring 92 correspondingly.

For the reverse direction of operation of the electric motor, there is a resulting opposite torque reaction on the side ring 47 so that the direction of rotation of the side ring 47 is counterclockwise. If the rollers 53 are neutral or free or have previously been in jamming engagement, the relative anticlockwise rotation of the ring 47 relative to the torque ring 76 immediately frees and slightly rotates the jamming rollers 53. The slightly rotating ring 47 then jams the rollers 54 between the rising cam surfaces 52 and the inner race of the torque ring 76 acting as another jamming roller mechanism. The jamming motion of either the rollers 53 or the rollers 54 is assisted and augmented by the springs 58.

In this fashion the side ring 47 for this new direction of rotation is firmly jammed together with or coupled to the torque ring 76, which then produces a translation of the pin 82 and a corresponding deflection of the leaf spring 92. Thus for either direction of motion of the electric motor 43 the reaction thereof is taken by the torque ring 76, which has only a limited amount of rotation, and thereafter serves as a stationary member holding the side ring 47 in position so that the planetary bevels 26 planet about the side gear 48 and an appropriate direction of rotation of the driven shaft 8 ensues as long as the motor is energized.

Advantage is taken of the deflection of the leaf spring 92 to control the electric motor in the event there are excessive torque requirements. Mounted on the sub-frame 95 are appropriate sensitive switches 106 and 107, each of which controls the shut off of the electric motor for a particular one of the directions of rotation. The switches 106 and 107 are adjustably mounted. For example, the switch 106 is carried in a swing frame 108 joined by a pivot pin 109 to the sub-frame 95 and is normally pressed to pivot outwardly by a spring 111. The spring is held by screws 112 and 113 and lies against a holding pin 114 in the sub-frame 95. The switch 106 is moved to and held in any selected pivotal position by an adjusting screw 116 which not only engages the swing frame 108 but is also threaded into the sub-frame 95.

By appropriate manipulation of the adjusting screw 116 an actuating roller 117 forming part of the switch 106 is moved toward or away from the adjacent portion of the leaf spring 92. Thus a particular deflection of the spring in response to a selected amount of torque is effective to actuate the sensitive switch 106. Appropriate leads (not shown) from that switch control the electric motor 43 in the usual way. Thus the two sensitive switches 106 and 107 can be adjusted to limit the operation of the electric motor in response to the desired values of torque.

Particularly pursuant to the invention, means are provided for disabling or disengaging the torque reaction means for the electric motor whenever the hand wheel 68 is operated so that there is no danger of the electric motor backdriving the hand wheel. The hand driven shaft 62 not only carries the torque ring 76, but at intervals is provided with disengaging pins 121 spanning cut-out portions 122 which accommodate the jamming rollers 53 and 54. The pins 121 are removably positioned so that they are interposed between the respective jamming rollers 53 and 54.

Figure 4:
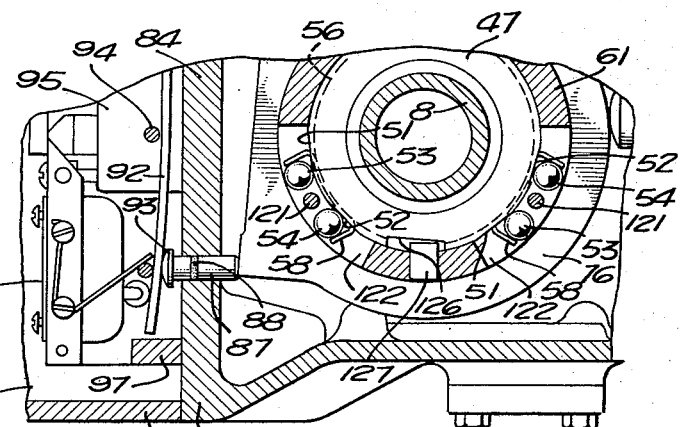
FIGURE 4 is a detail in cross section showing a portion of the mechanism of FIGURE 3 in a different position.
Figure 5:
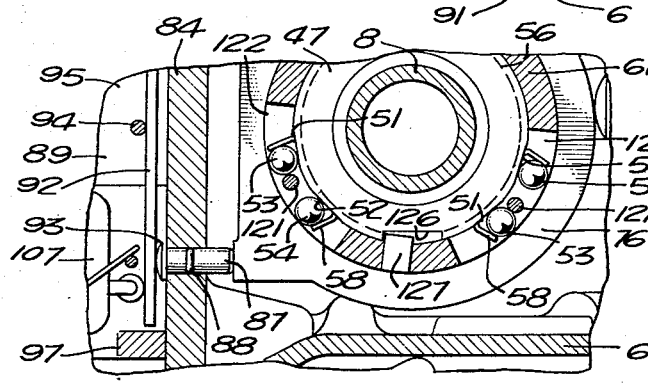
FIGURE 5 is a detailed fragmentary cross section like FIGURES 3 and 4 but showing the parts in a still different position of operation.

Whenever the hand wheel 68 is moved clockwise as seen in FIGURES 4 and 5, for example, the hand driven shaft 62 correspondingly rotates the several pins 121 in a similar direction. When this rotation has proceeded far enough, the pins 121 abut the several jamming rollers 53 and move such rollers down the cams and out of jamming engagement with the cam surfaces on the sub-jacent side ring 47 and thus free the jamming rollers 53 from engagement with the torque ring 76. This being true, even though the motor 43 should accidentally be energized in the clockwise direction, the side ring 47 advances with respect to the end 61 of the shaft 62 and the pins 121, thus returning the rollers 53 to jamming engagement with the ring 76 but without driving the hand wheel 68. Correspondingly, if the hand wheel 68 is revolved in a counterclockwise direction, as seen in FIG- URES 4 and 5, the various pins 121 after certain preliminary rotation then engage the jamming rollers 54 and move such rollers down the cams into a nonjamming or nonengaging position so that the torque ring 76 and the side ring 47 are freed from each other. Upon counterclockwise motor drive, the rollers 54 again jam but without spinning the handwheel. For either direction of motor operation, the device is safe.

After there has been sufficient relative movement to disengage the jamming rollers, further movement of the hand wheel 68 continuing either initial direction of rotation then is effective indirectly to connect the hand driven shaft 62 to the driven shaft 8. The side ring 47 is provided with a keyway 126 which is of considerably greater radial depth and circumferential extent than a cooperating key 127 fixed in the extension 61 of the hand driven shaft. There is thus afforded a lost motion connection between the hand driven shaft and the planetary gearing. The extent of this lost motion connection is such that after the jamming rollers have been disengaged the appropriate side of the keyway 126 is engaged by the projecting key 127. Further rotation of the hand driven shaft rotates the side ring 47 and the side gear 48. Since the worm 34 is non-overhauling, the side gear 28 takes the reaction and the planetary bevels 26 and spindles 24 rotate the driven shaft 8. Rotation of the hand wheel 68 thus provides a corresponding, gear-reduced rotation of the driven shaft 8 through any number of rotations and in the same direction.

The walls of the keyway 126 and the key 127 appropriately abut to form a unidirectional connection for either direction of rotation shortly after the corresponding jamming rollers have been disengaged by the hand driven shaft rotation. The proportions are such that the jamming rollers 53 or 54 respectively interengage with the inner and outer races of the jamming members while the key 127 is in some intermediate location in the keyway 126, so that when electric motor drive occurs, there is no physical abutment between the sides of the keyway 126 and of the key 127 and the lost motion is restored.

In this fashion we have produced a valve operator which is simply and economically fabricated, is of relatively small bulk and operates to afford electric motor drive under torque limit control in either of two directions and also affords hand wheel operation for two direction, but with an assurance that the electric motor drive cannot override the hand wheel drive.

What is claimed is:

1. A valve operator comprising a frame, a driven shaft journalled in said frame, a planetary gear mechanism including three meshing gears, means for connecting the first one of said gears to drive said driven shaft, a motor, means for connecting said motor to operate the second one of said gears, and means for resisting rotation of the third one of said gears including a torque ring, means for restricting the rotation of said torque ring relative to said frame, a first jamming roller mechanism for connecting said third one of said gears to said torque ring for one direction of rotation and for releasing said third one of said gears from said torque ring for the opposite direction of rotation, and a second jamming roller mechanism for connecting said third one of said gears to said torque ring for said opposite direction of rotation and for releasing said third one of said gears from said torque ring for said one direction of rotation.

2. A valve operator comprising a frame, a driven shaft journalled in said frame, a planetary gear mechanism including three meshing gears, means for connecting the first one of said gears to drive said driven shaft, an electric motor, means including a non-overhauling worm for connecting said motor to the second one of said gears, a torque ring, means for mounting said torque ring for limited rotation in said frame, a first jamming roller mechanism for connecting said torque ring and the third one of said gears for one direction of rotation and for disconnecting said torque ring and the third one of said gears for the opposite direction of rotation, a second jamming roller mechanism for connecting said torque ring and the third one of said gears for said opposite direction of rotation and for disconnecting said torque ring and the third one of said gears for said one direction of rotation, and means responsive to rotation of said torque ring for controlling said electric motor.

3. A valve operator comprising a frame, a driven shaft journalled in said frame, a planetary gear mechanism including three meshing gears, means for connecting the first one of said gears to drive said driven shaft, a motor, means including a non-overhauling worm for connecting said motor to the second one of said gears, a torque ring, means for mounting said torque ring for limited rotation on said frame, a first jamming roller mechanism for connecting said torque ring and the third one of said gears for one direction of rotation and for disconnecting said torque ring and the third one of said gears for the opposite direction of rotation, a second jamming roller mechanism for connecting said torque ring and the third one of said gears for said opposite direction of rotation and for disconnecting said torque ring and the third one of said gears for said one direction of rotation, a hand drive shaft, a lost-motion connection between said hand drive shaft and said driven shaft, and means controlled by said hand drive shaft for disconnecting said jamming roller mechanisms from said torque ring and the third one of said gears.

4. A valve operator comprising a frame, a driven shaft journalled in said frame, a planetary gear mechanism including three meshing gears, means for connecting the first one of said gears for driving said driven shaft, a motor, an irreversible driving connection between said motor and the second one of said gears, a torque ring, a pair of oppositely engaging jamming roller mechanisms for connecting said torque ring and said third one of said gears, a hand drive shaft, and means actuated by said hand drive shaft for driving said driven shaft and for disconnecting said jamming roller mechanisms from said torque ring and the third one of said gears.

5. A valve operator comprising a frame, a driven shaft journalled in said frame, a planetary gear mechanism including three meshing gears, means for connecting the first one of said gears for driving said driven shaft, a motor, a driving connection between said motor and the second one of said gears, a torque ring, means for mounting said torque ring for limited rotation in said frame, a pair of jamming roller mechanisms for connecting said torque ring and the third one of said gears, each of said jamming roller mechanisms being effective for a particular direction of rotation of said third one of said gears, a hand drive shaft, and means actuated by said hand drive shaft for operating either of said jamming roller mechanisms to disconnect said torque ring and the third one of said gears in accordance with the direction of rotation of said hand drive shaft.

6. A valve operator as in claim 5 with the addition of a lost-motion driving connection between said hand drive shaft and said third one of said gears.

7. A valve operator as in claim 5 with the addition of a lost-motion driving connection between said hand drive shaft and said driven shaft effective only after said torque ring and the third one of said gears have been disconnected by said jamming roller mechanisms.

8. A valve operator comprising a frame, a driven shaft journalled in said frame, means on said frame for imposing a driving torque on said driven shaft, a jamming roller mechanism including an inner race and an outer race, means for coupling said inner race to said driven shaft, means for coupling said outer race to said frame, a first jamming roller between said inner race and said outer race and adapted to move between a first position jamming said races together and a second position releasing said races, a hand drive shaft, means for moving said jamming roller into said jamming first position, a hand wheel on said hand drive shaft and coupled thereto, and means on said hand drive shaft for moving said first jamming roller from said jamming first position to said releasing second position.

9. A valve operator as in claim 8 in which said first jamming roller is effective in one direction of relative rotation between said races and there is a second jamming roller between said inner race and said outer race effective in the opposite direction of relative rotation between said races, and in which said moving means is effective upon said first jamming roller for one direction of rotation of said hand drive shaft relative to said frame and is effective upon said second jamming roller for the opposite direction of rotation of said hand drive shaft relative to said frame.

10. A valve operator as in claim 8 in which said hand drive shaft and said driven shaft are coupled by a lost-motion driving connection.

References Cited by the Examiner
UNITED STATES PATENTS

| | | | |
|---|---|---|---|
| 1,218,236 | 3/1917 | Backscheider | 74—801 |
| 2,251,466 | 8/1941 | Payson | 192—8 |
| 2,621,544 | 12/1952 | Rossmann | 74—675 |
| 2,812,044 | 11/1957 | Cole | 192—8 |
| 3,031,899 | 5/1962 | Bacchi | 74—626 |

BROUGHTON G. DURHAM, *Primary Examiner.*
DAN A. WAITE, *Examiner.*